United States Patent Office 3,063,988
Patented Nov. 13, 1962

3,063,988
STEROID-21-AMINO ACID ESTERS AND PROCESS OF PREPARING THEM
Werner Fritsch, Neuenhain, Taunus, Germany, assignor to Farbwerke Hoechst Aktiengesellschaft vormals Meister Lucius & Brüning, Frankfurt am Main, Germany, a corporation of Germany
No Drawing. Filed Nov. 8, 1960, Ser. No. 67,916
Claims priority, application Germany Nov. 14, 1959
1 Claim. (Cl. 260—239.5)

The manufacture of water-soluble compounds of the practically water-insoluble steroids is of considerable importance for therapeutic purposes. Various methods have been used to obtain water-soluble steroids; thus, for example, the steroids were converted into compounds of the kind of glucosides, but the substances thus obtained were not adequately soluble. Furthermore, it is already known to impart water-solubility to steroid compounds by semi-esterifying a steroid-hydroxy compound with a polybasic acid and by converting the semi-ester thus obtained into an alkali metal salt. When dissolved in water the salts so obtained, for example, the salts of the succinic acid esters, have a pH value which is within the alkaline range. At such pH values, however, already a saponification of the ester linkage takes place. Hence, no stable aqueous solutions can be obtained. It was, therefore, necessary, to put such alkali metal salts on the market as dry substance packed in ampules and before its application the substance had to be dissolved and then immediately used up. This naturally means a complicated process for the physician. Furthermore, a number of steroid compounds is unstable in the alkaline range, so that rearrangements and the like might occur.

It is already known that, for example, 21-amino-acetates of the 21-hydroxypregnane-3,-20-dione, of the hydrocortisone, the prednisolone and the 9α-fluorine hydrocortisone are obtained by treating the corresponding 21-hydroxypregnane or 21-hydroxypregnene derivatives with chloroacetic acid anhydride and by reacting the 21-chloroacetates thus formed with secondary amines (cf. German Patent No. 1,037,451).

The present invention relates to new steroid-21-amino acid esters of the formula

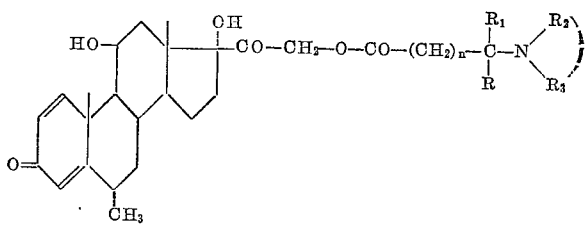

wherein $n$ is a member selected from the integers 0, 1 and 2, R is a member selected from the group consisting of hydrogen, alkyl containing from 1 to 3 carbon atoms, phenyl and methoxyphenyl, $R_1$ is a member selected from the group consisting of hydrogen, methyl and ethyl, $R_2$ and $R_3$ are members selected from the group consisting of hydrogen and alkyl containing 1 to 4 carbon atoms, and wherein

form the pyrrolidino, piperidino and morpholino ring and to physiologically compatible acid addition salts of these compounds.

The present invention furthermore relates to a process of preparing those new steroid-21-amino acids esters of the formula

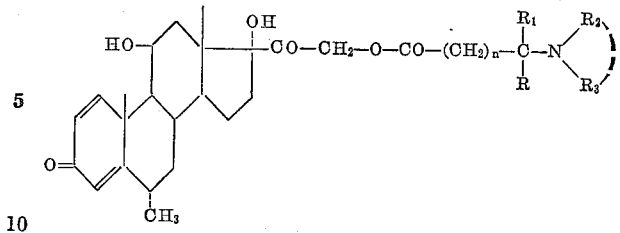

wherein $n$ is a member selected from the integers 0, 1 and 2, R is a member selected from the group consisting of hydrogen, alkyl containing from 1 to 3 carbon atoms, phenyl and methoxyphenyl, $R_1$ is a member selected from the group consisting of hydrogen, methyl and ethyl, $R_2$ and $R_3$ are members selected from the group consisting of hydrogen and alkyl containing 1 to 4 carbon atoms, and wherein

form the pyrrolidino, piperidino and morpholino ring, which comprises reacting at temperatures between 20 and 100° C. and in the presence of a dialkyl formamide as a solvent a steroid of the formula

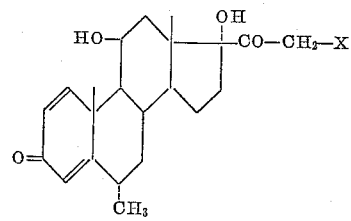

wherein X is a member selected from the group consisting of chlorine and mesyl corresponding to the formula $O-SO_2-CH_3$, with an alkali metal salt of an amino acid of the formula

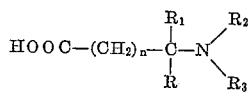

wherein $n$, R, $R_1$, $R_2$ and $R_3$ have the meanings given above.

As alkyl groups R there may be mentioned, for example, methyl, ethyl, n-propyl and isopropyl. As alkyl groups $R_2$ and $R_3$ there enter into consideration, for example, methyl, ethyl, n-propyl, isopropyl, n-butyl, isobutyl, secondary butyl and tertiary butyl. Straight chained alkyl groups are preferably used.

The products obtained according to the process of the present invention represent valuable medicaments with especially glucocorticoidal and antiinflammatory efficiency. Furthermore, it is of considerable advantage that the aqueous solutions which can be obtained from their salts show an excellent durability and stability.

As starting material for the manufacture of steroid-21-amino acid esters there enter into consideration for example, 21-chloro-6α-methyl-Δ$^{1,4}$-pregnadiene-11β,17α-diol-3,20-dione or 21-methyl sulfonic acid-6α-methyl-Δ$^{1,4}$-pregnadiene-11β,17α-diol-3,20-dione, shortly defined as 21-chloro-6α-methyl-prednisolone and 21 methyl sulfonic acid-6α-methyl-prednisolone. The 21-methyl sulfonic acid-6α-methyl-prednisolone can advantageously be obtained by the reaction of 6α-methyl-prednisolone with methyl sulfonic acid chloride in pyridine, preferably in the presence of an inert solvent. The manufacture grants an especially good yield, if the reaction is carried out at 0° C. and in the presence of acetone as diluent, as the desired 21-methyl sulfonic acid derivative is obtained in practically analytically pure form when operating in this manner. The 21-chloro-6α-methyl-prednisolone is advantageously produced by reacting 6α-methyl-prednisolone with organic sulfochlorides, preferably with methyl sulfonic acid chloride in the presence of pyridine and inert solvents or diluents at a raised temperature.

As reaction components of the mentioned starting materials there enter into consideration the alkali metal salts, preferably the sodium and potassium salts of any amino acid which is covered by the above mentioned general formula. Especially suitable are amino acids which are mono- or di-substituted in the amino group, for there may be mentioned for example: Diethyl amino-acetic acid, pyrrolidino-acetic acid, piperidino-acetic acid, morpholino-acetic acid, β-amino-β-methyl-butyric acid, γ-amino-butyric acid, α-amino-propionic acid, α-methyl-amino-propionic acid, α-diethylamino-propionic acid, α-n-butyl-amino-propionic acid, γ-methyl-α-amino-butyric acid, γ-methyl-α-methylamino-butyric acid, γ-methyl-α-diethylamino-butyric acid, α-piperidino-propionic acid, β-phenyl-β-amino-butyric acid, 2-(m-methoxyphenyl)-2-ethyl-butylamino-acetic acid and the like.

According to the process of the present invention the reaction is suitably carried out in the presence of dialkyl-formamides, for example dimethylformamide, as solvents or diluents at temperatures between 20–100° C., advantageously between 65 and 70° C. The reaction period generally ranges between 1–20 hours. When using 21-methyl sulfonic acid-6α-methyl-prednisolone as starting substances, the most favourable reaction period ranges between about 16–18 hours, whereas 21-chloro-6α-methyl-prednisolone generally requires a shorter reaction period. A favourable method of carrying out the process of the present invention consists in dissolving or suspending 21-chloro- or 21-methyl-sulfonic acid-6α-methyl-prednisolone in dimethylformamide, heating the mixture to moderately raised temperatures, for example to 60–70° C., adding either an equivalent or an excess amount of the corresponding amino acid in the form of finely dispersed sodium or potassium salt and maintaining the temperature of the reaction mixture for some hours at 60–70° C., while mechanically stirring.

If the alkali metal salts of such amino acids are reacted the isoelectrical point of which is strongly shifted to the alkaline range (for example in case of the β-amino-β-methyl-butyric acid) it has proved to be of advantage to use the reaction component in the form of a buffer-mixture consisting of free amino acid and the alkali metal salt of the amino acid.

For working up the reaction mixture is preferably acidified with a dilute acid, for example 2 N-hydrochloric acid, and subsequently diluted with water. Undissolved portions are separated by filtration or extraction of the reaction mixture with a solvent immisicible with water, for example diethyl ether or methylene chloride. The 21-amino acid esters of the 6α-methyl-prednisolone obtained by the reaction are precipitated by neutralization of the aqueous acid phase by means of bases, for example sodium hydroxide solution, sodium carbonate or sodium bicarbonate solution, and after having been dried, they can be recrystallized from suitable organic solvents, for example, ethyl acetate.

The direct reaction of steroids with alkali metal salts of amino acids according to the process of the invention has been hitherto unknown and is so far surprising, as in the reaction of 21-chlorosteroids with salts of amino acids containing a tertiary amino group, a formation of corresponding quaternary salts should be expected, owing to the reactivity of the chlorine atom.

The steroid-21-amino-acid esters obtained according to the process of the present invention can be converted, if desired, into the corresponding acid addition salts by treating them with inorganic or organic acids. As inorganic acids there enter into consideration, for example hydrohalic acids like hydrochloric acid and hydrobromic acid, sulfuric acid and phosphoric acid, whereas as organic acids, for example, formic acid, acetic acid, propionic acid, fumaric acid, maleic acid, succinic acid, tartaric acid, malic acid, citric acid or ethylene-diamine-tetracetic acid are suitable.

The new products obtained according to the process of the invention represent valuable medicaments with especially glucocorticoidal and anti-inflammatory efficiency. While examining their antiphlogistical efficiency in the aerosil test in the albino rat an aqueous solution of 6α-methyl-$\Delta^{1,4}$-pregnadiene - 11β,17α - 21 - triol - 3,20-dione-21-diethylamino-acetate-hydrochloride showed the same effect as the aqueous solution of the already known sodium salt of the 6α-methyl-$\Delta^{1,4}$-pregnadiene-11β,17α-21-triol-3,20-dione-21-hemisuccinate. The new product 6α-methyl-$\Delta^{1,4}$-pregnadiene-11β,17α-21-triol-3,20 - dione - 21 diethylamino-acetate-hydrochloride was 16 times more effective in the liver-glycogene test than the corresponding known $\Delta^{1,4}$-pregnadiene-11β,17α-21-triol-3,20-dione (prednisolone). Contrary to the prednisolone the new compound effects no undesired salt retention, it, moreover, in the test in the adrenalectomized rat exhibits a sodium and water diuresis which is to be considered as being advantageous. The new compounds possess a very good efficiency in the treatment of inflammatory and allergic diseases of the eyes, the skin and the mucous membrane. Furthermore, they are suitable for the treatment of the arthritis as well as the chronic dermatitis.

A further special advantage is the good solubility in water of the salts and the excellent stability of the aqueous solutions which can be produced from the salts of the new compounds. Thus, it has been found, for example, that an aqueous solution of 6α-methyl-prednisolone-21-diethylamino-acetate-hydrochloride had remained still unchanged after about 15 weeks. Contrary thereto the stability of an aqueous solution of the sodium salt of the known compound 6α-methyl-prednisolone-21-hemisuccinate lasted for only about 3 weeks.

The following examples serve to illustrate the invention but they are not intended to limit it thereto:

EXAMPLE 1

*6α-Methyl-Prednisolone-21-Diethylamino Acetate*

5.23 grams of 21-chloro-6α-methyl-$\Delta^{1,4}$-pregnadiene-11β,17α-diol-3,20-dione are introduced into a suspension of 7 grams of sodium diethylamino-acetate in 25 cc. of dimethylformamide, and the reaction mixture is stirred for 2 hours at a bath temperature of 65° C. After cooling, 15 cc. of methanol are added, the mixture is acidified with 2 N-hydrochloric acid and then 150 cc. of water are added. A small amount of precipitated flakes are removed by extraction with ether. The aqueous phase is adjusted to a pH value of 8 with sodium bicarbonate solution, whereby 6α-methyl-prednisolone-21-diethylamino acetate precipitates in crystalline form. After the filtration residue has been filtered off and washed with water the obtained 6α-methyl-prednisolone-21-diethylamino acetate is dried in vacuo at a temperature of 50° C. There are obtained 5.35 grams of the product melting at 172°/206–208° C. (Kofler-heater). After recrystallization from glacial acetic acid the substance melts at 174°/209° C.

The corresponding hydrochloride can, for example, be prepared as follows:

2.84 g. of 6α-methyl-prednisolone-diethyl-amino acetate are suspended in 20 cc. of methanol and, while cooling and stirring, 58.2 cc. of 1.0 N-hydrochloric acid are added. After evaporation of the methanol under reduced pressure, the clear aqueous distillation residue shows a pH value of 4.3 to 4.4. After lyophilization the 6α-methyl-prednisolone-21-diethylaminoacetate-hydrochloride is obtained in a practically quantitative yield.

The 21-chloro-6α-methyl-$\Delta^{1,4}$-pregnadiene-11β,17α-diol- 3,20-dione which is used as starting material is, for example, produced in the following manner:

8.3 cc. of pyridine are added, while stirring, to a suspension of 5 g. of 6α-methyl-prednisolone in 28 cc. of acetone and the mixture is heated to the boil under nitrogen. 4.1 cc. of methane sulfonic acid chloride are then stirred into the solution. After having stirred for 15 minutes, the reaction mixture is cooled to 0° C. and subsequently diluted with 100 cc. of ice cold water. After 2 hours' stirring, the 21-chloro-6α-methyl-Δ$^{1,4}$-pregnadiene-11β, 17α-diol-3,20-dione which precipitates in the form of crystals, is filtered off and washed with water until showing a neutral reaction. After drying in vacuo, the obtained crude product, showing a melting point of 176–180° C. (Kofler-heater) can be used directly for the further reaction. The yield amounts to 5.23 g.

EXAMPLE 2

*6α-Methyl-Prednisolone-21-Diethyl-Amino-Acetate*

5.98 g. of 21-methyl sulfonic acid-6α-methyl-Δ$^{1,4}$-pregnadiene-11β,17α-diol-3,20-dione are introduced into a stirred suspension of 8.4 g. of sodium diethylamino-acetate in 30 cc. of dimethylformamide. The reaction mixture is heated for 8 hours to 70° C. while stirring well. After cooling, the mixture is acidefied with 2 N-hydrochloric acid and diluted with 500 cc. of cold water. A weak turbidity is removed by extraction with ether. The aqueous phase is adjusted to a pH value of 8 with 2 N-sodium carbonate solution, whereby 6α-methyl-prednisolone-21-diethylamino acetate precipitates. After filtration, washing with water and drying in vacuo, the yield of 6α-methyl-prednisolone-21-diethylamino acetate amounts to 6.22 g. The compound melts at 209° C. (Kofler-heater).

The 21-methylsulfonic acid-6α-methyl-Δ$^{1,4}$-pregnadiene-11β,17α-diol-3,20-dione, which is used as starting material, is, for example, produced as follows:

A suspension of 5 g. of 6α-methyl-prednisolone in 28 cc. acetone and 8.3 cc. of pyridine is heated to the boil within a short period and subsequently cooled to 0° C. 4.1 cc. of methane sulphonic acid chloride are then added and the reaction mixture is stirred for 16 hours at 0° C. under nitrogen. 100 cc. of ice cold water are then stirred within 10 minutes into the mixture. After further stirring for ½ hour, the 21-methyl sulfonic acid-6α-methyl-Δ$^{1,4}$-pregnadiene-11β,17α-diol-3,20-dione which precipitates, is filtered off, washed with water until showing a neutral reaction and dried in vacuo at a temperature of 40° C. After standing for some time, a further 21-methyl-sulfonic acid derivative precipitates from the filtrate which is concentrated under reduced pressure. After drying the total yield amounts to 5.98 g. The substance melts at 237° (Kofler-heater).

EXAMPLE 3

*6α-Methyl-Prednisolone-21-Piperidino-Acetate*

A well triturated mixture from 3.1 g. of sodium piperidino-acetate and 2.38 g. of 21-methyl-sulfonic acid-6α-methyl-Δ$^{1,4}$-pregnadiene-11β,17α-diol-3,20-dione is heated, while stirring, for 16 hours to 70° C. in 12 cc. of dimethylformamide. The further working up is carried out as indicated in Example 2. 2.78 g. of 6α-methyl-prednisolone-21-piperidino-acetate melting at 208° C. (Kofler-heater) are obtained. The product obtained can be converted into the corresponding hydrochloride, according to the method described in Example 1.

EXAMPLE 4

*6α-Methyl-Prednisolone-21-Morpholino-Acetate*

6.2 g. of sodium-morpholino-acetate and 4.8 g. of 21-methyl-sulfonic acid-6α-methyl-Δ$^{1,4}$-pregnadiene-11β,17α-diol-3,20-dione are reacted and worked up in 25 cc. of dimethylformamide, corresponding to the method described in Example 3. 5.41 g. of 6α-methyl-prednisolone-21-morpholino-acetate melting at 162°/214° C. (Kofler-heater) are obtained.

EXAMPLE 5

*6α-Methyl-Prednisolone-21-(β-amino-β-methyl)-Butyrate*

A mixture of 4.9 g. of sodium-β-amino-β-methyl-butyrate and 0.5 g. of β-amino-β-methyl-butyric acid is heated for 18 hours, while stirring, to 70° C. together with 2.5 g. of 21-methyl-sulfonic-acid-6α-methyl-Δ$^{1,4}$-pregnadiene-11β,17α-diol-3,20-dione in 20 cc. of dimethylformamide. After cooling the mixture is acidified with 2 N-hydrochloric acid and is filtered off with suction from the small amount of precipitated flakes. The filtrate is subsequently adjusted to a pH value of 8.5–9 with 2 N-sodium carbonate solution, the obtained 6α-methyl-prednisolone-21-(β-amino-β-methyl)-butyrate is filtered off, washed with water and dried at 50° C. in vacuo. 1.49 g. of 6α-methyl-prednisolone-21-(β-amino-β-methyl)-butyrate melting at 160–165° C. (under decomposition, Kofler-heater) are obtained.

EXAMPLE 6

*6α-Methyl-Prednisolone-21-[2-(m-Methoxyphenyl)]-2-Ethyl-Butylamino-Acetate*

10 g. of the sodium salt of 2-(m-methoxyphenyl)-2-ethyl-butylamino-acetic acid and 5.88 g. of 21-methylsulfonic acid-6α-methyl-Δ$^{1,4}$-pregnadiene-11β,17α-diol-3,20-dione are reacted in 30 cc. of dimethylformamide and worked up as described in Example 3. After recrystallization from acetic acid ester, 5.9 g. of 6α-methyl-prednisolone-21-[2-(m-methoxyphenyl)]-2-ethyl-butylamino-acetate, melting at 169° C. (Kofler-heater) are obtained.

EXAMPLE 7

*6α-Methyl-Prednisolone-21-γ-Amino-Butyrate*

5 g. of sodium salt of γ-amino-butyric acid and 2.95 g. of 21-methyl-sulfonic acid-6α-methyl-Δ$^{1,4}$-pregnadiene-11β,17α-diol-3,20-dione are reacted in 17 cc. of dimethylformamide and worked up as described in Example 3. 0.5 g. of 6α-methyl-prednisolone-21-γ-aminobutyrate melting at 175° C. is obtained.

EXAMPLE 8

*6α-Methyl-Prednisolone-21-(β-Amino-β-Methyl)-Butyrate*

5.85 g. of 21-methylsulfonic acid-6α-methyl-Δ$^{1,4}$-pregnadiene-11β, 17α-diol-3,20-dione and 4.5 g. of sodium salt of β-amino-β-phenylbutyric acid are heated in 40 cc. of dimethylformamide for 5 hours to 70° C., while stirring mechanically. The further working up is carried out as described in Example 2. 2.6 g. of 6α-methyl-prednisolone-21-(β-amino-β-methyl)-butyrate melting at 223° C. (Kofler-heater) are obtained. The product can be converted into the corresponding hydrochloride according to the method described in Example 1.

I claim:

The process of preparing steroid-21-amino acid esters of the formula

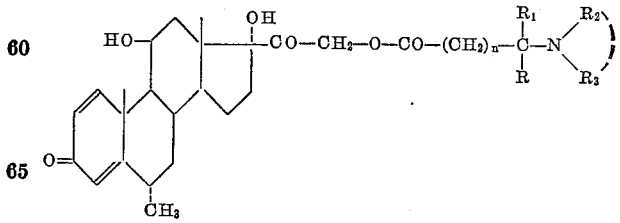

wherein *n* is a member selected from the integers 0, 1 and 2, R is a member selected from the group consisting of hydrogen, alkyl containing from 1 to 3 carbon atoms, phenyl and methoxyphenyl, $R_1$ is a member selected from the group consisting of hydrogen, methyl and ethyl, $R_2$ and $R_3$ are members selected from the group consisting of hydrogen and alkyl containing 1 to 4 carbon atoms, and wherein

form the pyrrolidino, piperidino and morpholino ring which comprises reacting at temperatures between 20 and 100° C. and in the presence of a dialkylformamide as a solvent a steroid of the formula

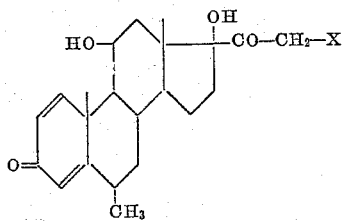

wherein X is a member selected from the group consisting of chlorine and mesyl corresponding to the formula

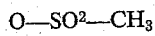

with an alkali metal salt of an amino acid of the formula

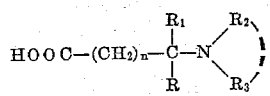

wherein $n$, R, $R_1$, $R_2$ and $R_2$ have the meanings given above.

References Cited in the file of this patent

UNITED STATES PATENTS

| | | |
|---|---|---|
| 2,708,651 | Taubach | May 17, 1955 |
| 2,873,285 | Korman | Feb. 10, 1959 |
| 2,897,218 | Sebek et al. | July 28, 1959 |
| 2,979,518 | Van Dorp | Apr. 11, 1961 |

OTHER REFERENCES

Groggins: Unit Processes in Organic Synthesis, 5th Ed., 1958, p. 718.